(12) United States Patent
Morris et al.

(10) Patent No.: US 7,111,444 B1
(45) Date of Patent: Sep. 26, 2006

(54) LAWN TRACTOR LIFT

(76) Inventors: Larry D. Morris, 758 McCandless, Andover, KS (US) 67002; Terry L. Emond, 9527 SW. Otto, Augusta, KS (US) 67010

( * ) Notice: Subject to any disclaimer, the term of this patent is extended or adjusted under 35 U.S.C. 154(b) by 5 days.

(21) Appl. No.: 10/783,479

(22) Filed: Feb. 20, 2004

(51) Int. Cl.
*A01D 34/03* (2006.01)
*A01D 34/43* (2006.01)
*A01D 34/64* (2006.01)

(52) U.S. Cl. ............... 56/15.9; 254/133; 414/426; 414/428

(58) Field of Classification Search ............ 56/1, 56/14.9, 15.2, 14.7, 15.1, 15.3, 15.9, 218, 56/16.7, 13.5, 208; 254/3 C, 6 R, 6 B, 6 C, 254/10 R, 8 B, 8 C, 121, 131, 130, 133, 254/134, 100, 94, 88; D34/28, 23, 31; 414/426, 414/428
See application file for complete search history.

(56) References Cited

U.S. PATENT DOCUMENTS

| | | | | |
|---|---|---|---|---|
| 1,334,336 A | * | 3/1920 | Weimar | 269/58 |
| 2,135,802 A | * | 11/1938 | Dinkins | 414/428 |
| 2,415,018 A | | 1/1947 | McDonald | |
| 2,483,908 A | * | 10/1949 | Jackson | 414/428 |
| 2,517,631 A | * | 8/1950 | Coleman | 414/428 |
| 2,551,483 A | * | 5/1951 | Bartoe | 414/428 |
| 2,570,587 A | * | 10/1951 | Noone et al. | 414/428 |
| 2,802,162 A | | 10/1957 | Hellyer | |
| 2,808,162 A | * | 10/1957 | Hellyer | 414/428 |
| 2,877,912 A | * | 3/1959 | Di Giacomo | 414/428 |
| 3,326,525 A | | 6/1967 | Kauppi | |
| 3,441,157 A | * | 4/1969 | Kitsuda | 414/428 |
| 3,463,337 A | * | 8/1969 | Reznicek | 414/428 |
| 3,674,252 A | * | 7/1972 | Crabtree et al. | 269/55 |
| 3,779,517 A | * | 12/1973 | Fisher | 254/134 |
| 3,828,953 A | * | 8/1974 | Reznicek | 414/428 |
| 3,847,294 A | * | 11/1974 | Davenport | 414/428 |
| 4,549,721 A | | 10/1985 | Stone | |
| 4,579,505 A | * | 4/1986 | Lauritsen | 414/678 |
| 4,836,739 A | * | 6/1989 | Cappelletto et al. | 414/678 |
| 5,000,423 A | | 3/1991 | Snickers | |
| 5,238,361 A | * | 8/1993 | Liqui | 414/678 |
| 5,971,360 A | | 10/1999 | Sinsley | |
| 6,106,216 A | * | 8/2000 | Hogan | 414/678 |
| 6,330,997 B1 | | 12/2001 | McGlaun et al. | |
| 6,341,763 B1 | | 1/2002 | Lefebvre | |
| 6,474,625 B1 | | 11/2002 | Bevre | |
| 6,474,626 B1 | | 11/2002 | Box | |
| 2003/0222252 A1 | | 12/2003 | VanValkenburgh | |

* cited by examiner

*Primary Examiner*—Árpád Fábián Kovács
(74) *Attorney, Agent, or Firm*—Kenneth H. Jack; Davis & Jack, L.L.C.

(57) ABSTRACT

A lawn tractor lift consisting of a lift arm having a forward end and a rearward end, a tire wheel receiving cradle pivotally mounted upon the forward end of the lift arm; a lever arm having a forward end and a rearward end, and a curved bar providing a variable fulcrum, the curved bar having a forward end and a rearward end, and a pivot point, the rearward end of the curved bar being fixedly attached to or formed wholly with the forward end of the lever arm, the forward end of the curved bar being fixedly attached to or formed wholly with the rearward end of the lift arm, the curved bar, upon alternate levering and counter-levering of the lever arm, alternately rearwardly and forwardly moving the pivot point.

8 Claims, 3 Drawing Sheets

LAWN TRACTOR LIFT

FIELD OF THE INVENTION

This invention relates to apparatus adapted for raising and lowering vehicles. More particularly, this invention relates to such apparatus which are specially adapted for raising and lowering lawn or garden tractors.

BACKGROUND OF THE INVENTION

Lawn or garden tractors commonly include a rotary blade mower deck which is suspended below the tractor's chassis, and which is positioned between the tractor's front and rear tires. Periodic maintenance of lawn or garden tractors commonly includes tasks of cleaning the mower deck by scraping mud and debris from under surfaces of the mower deck, and removal, sharpening, and reinstallation of grass cutting rotary blades. In order to perform such maintenance tasks, clearance between the ground and the lower surfaces of the mower deck must be sufficient to allow an operator to access the under surfaces of the mower deck with tools such as wrenches and scrapers.

A commonly utilized means for providing the needed ground clearance for such mower deck maintenance includes steps of providing a pair of wheel stand ramps, and driving the front tires of the lawn or garden tractor up the ramps and onto the wheel stands. Drawbacks and deficiencies of such mower deck access means include insufficient resultant ground clearance, and ramp structures blocking access to the under surfaces of the mower deck.

Another commonly known means for providing ground clearance for lawn tractor mower deck maintenance includes steps of situating the lawn or garden tractor upon a vertical vehicle lift, and operating such apparatus for vertically raising the lawn or garden tractor above the ground. Common drawbacks or deficiencies of utilizing such vertical lifts include excess bulk and immobility of vertical lift machines, high expense of obtaining and maintaining vertical lifting machines, and an awkward resultant horizontal orientation of the lawn or garden tractor upon vertically lifting.

The instant inventive lawn tractor lift overcomes or ameliorates the problems and deficiencies described above by providing a lift arm, fulcrum, and lever arm assembly which is capable of attachment to a lawn or garden tractor's front tires, and which provides a rearwardly moveable fulcrum or pivot point for providing enhanced mechanical lifting advantage upon initial levering and, in sequence, providing enhanced upward movement upon final levering.

BRIEF SUMMARY OF THE INVENTION

The instant inventive lawn tractor lift is intended to be utilized for raising and lowering the front wheels of both lawn tractors and garden tractors. References below to lawn tractors are intended to describe and apply equally to garden tractors.

A first component of the instant inventive lawn tractor lift comprises a lift arm having a forward end and a rearward end. Preferably, the lift arm comprises left and right lift bars, each such bar having forward and rearward ends corresponding to the forward and rearward ends of the lift arm. Suitably, though less desirably, the lift arm may comprise a single lift bar.

A further structural component of the instant inventive lawn tractor lift comprises tractor wheel mounting means fixedly attached to the forward end of the lift arm. Preferably, the tractor wheel mounting means comprises a tire cradle having left and right ends. The tractor wheel mounting means preferably further comprises pivoting means connected operatively to the left and right ends of the tire cradle, the pivoting means being further connected operatively to the forward end of the lift arm. Such tire cradle preferably comprises front and rear cross bars which define therebetween a tire obturation space. Preferably, the cross bars have a sufficient length to accommodate the widths of common lawn tractors. Also preferably, the left and right ends of the front and rear cross bars underlie the pivoting means a distance greater than the radiuses of tires to be carried by the cradle.

Where the lift arm comprises the preferred left and right lift bars, the pivoting means preferably comprises left and right end plates respectively fixedly attached to the left and right ends of the front and rear cross bars. The left and right end plates preferably extend upwardly above the load bearing surfaces of the front and rear cross bars, such extension being greater than the radiuses discussed above. Upper ends of the left and right end plates preferably incorporate rotary bearings which receive stub axles or journals which preferably extend laterally from the forward ends of the left and right lift bars. In operation, such tire cradle is capable of pivoting about its rotary bearing mounts for maintaining the tire receiving cross bars in a stable horizontally oriented tire retaining position at all times during tractor raising and lowering operations.

Suitably, the tractor wheel mounting means may alternately comprise a pair of tire receiving brackets such as arcuately curved "C" plate and strap combinations, the alternate brackets being adapted for securely receiving paired lawn tractor tires.

A further component of the instant inventive lawn tractor comprises a lever arm having forward and rearward ends. Like the lift arm, the lever arm preferably comprises left and right lever bars. Like the lift arm, the lever arm may suitably, though less desirably, alternately comprise a single bar.

A further component of the instant inventive lawn tractor lift comprises variable fulcrum means having forward and rearward ends, such means spanning between and interconnecting the forward end of the lever arm and the rearward end of the lift arm. Preferably, the variable fulcrum means comprises left and right curved bars, each such bar having forward and rearward ends.

In operation of the instant invention, and assuming incorporation of the preferred pivoting tire cradle, paired lift bars, the left paired curved bars, and the paired lever bars, such tire cradle is placed upon a garage floor surface causing the left and right curved bars to simultaneously contact the garage floor at pivot points or fulcrum points near their forward ends. Thereafter, the front tires of a lawn tractor are rolled onto the tire cradle's cross bars. Thereafter, the lever bars are pulled downwardly and rearwardly until such bars come into contact with the garage floor surface. Upon initiation of such levering action, the points of contact between the curved bars and the garage floor surface act as fulcrums for transferring torque applied to the lever bars into an upwardly directed tractor lifting force at the forward ends of the lift bars. As the levering action progresses, rearward rolling or rocking of the curved bars causes the floor contact fulcrum points to progressively move rearwardly.

At the commencement of the downward and rearward levering action, the rearwardly moveable ground contacting fulcrum points provide an enhanced mechanical lifting advantage. As the levering action nears completion, the rearwardly moveable fulcrum provides for enhanced upward tractor lifting motion. The progressive transition from lifting force to upward motion advantageously matches the mechanical dynamics associated with lifting a front end of a lawn tractor wherein the required lifting force is greatest while the lawn tractor is oriented horizontally, and wherein the required lifting force lessens as the tractor's front end extends angularly upward.

The variable fulcrum means element of the instant invention may alternately comprise singular or paired bars which comprise a plurality of progressively angled bar sections forming a curved series of fulcrum points at the junctures of such sections. Also suitably, the variable fulcrum means may alternately comprise series of ground engaging rollers or low friction slides, the rollers or low friction slides being mounted upon a generally curved support member and being arranged along arcuate paths extending from the forward ends of the lever bars to the rearward ends of the lift bars. Incorporation of rollers or low friction slides may advantageously accommodate lawn tractor lifting under circumstances when the tractor's rear wheels remain locked during lifting.

Where the preferred paired lever bars, curved bars, and lift bars are provided, cross bracing preferably spans between such members for structural rigidity. Preferably, major components of the inventive lift are detachably interconnected for compact shipping and storage.

Accordingly, objects of the instant invention include provision of a lawn tractor lift comprising a combination of a lever arm, a lift arm, and a variable fulcrum means, and incorporating features and functions described above.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
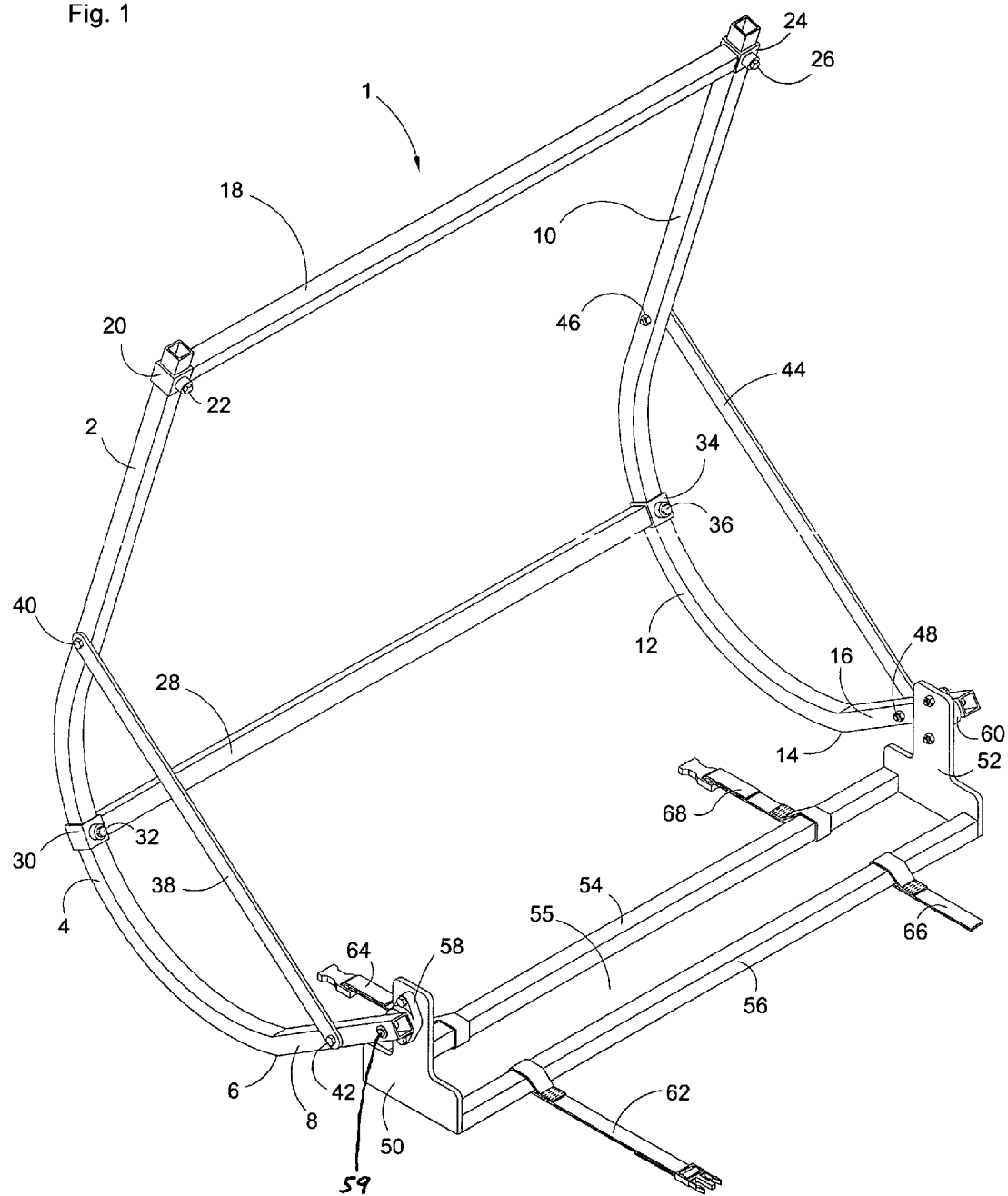
FIG. 1 is an isometric view of the instant inventive lawn tractor lift.

Referring now to the drawings, and in particular to FIG. 1, a preferred embodiment of the instant inventive lawn tractor lift is referred to generally by Reference Arrow 1. The lawn tractor lift 1 comprises a lift arm preferably consisting of left and right lift bars 8 and 16. The lawn tractor lift 1 further comprises variable fulcrum means preferably consisting of left and right curved bars 4 and 12. The lawn tractor lift 1 further comprises a lever arm preferably consisting of left and right lever bars 2 and 10. The left lever bar 2, the left curved bar 4, and left lift bar 8 are preferably wholly formed as a unit, such bars comprising a single length of one inch steel square tubing. The right lever bar 10, the right curved bar 12, and the right lift bar 16 are similarly preferably wholly formed of a single length of one inch steel square tubing.

A tire cradle is preferably pivotally mounted upon the forward ends of lift bars 8 and 16, such cradle preferably comprising front and rear cross bars 54 and 56, left and right end plates 50 and 52, and axle receiving bearings 58 and 60. Stub axles or journals 59 (not depicted within view of FIG. 1) preferably extend laterally inward from the forward ends of lift bars 8 and 16, such axles or journals being rotatably and nestingly received by bearings 58 and 60.

A plurality of cross braces 18 and 28 preferably rigidly interconnect the left and right sides of the lawn tractor lift 1. Sleeve joints 20, 24, 30, and 34 secured by set screws 22, 26, 32, and 36 are the preferred cross brace mounting means. Other commonly configured "T" joint brackets may be suitably substituted for the preferred sleeve joints. Preferably, cross brace 18 spans between the rearward ends of lever bars 2 and 10, allowing brace 18 to dually serve as a lever handle and as a structural bracing member. Cross brace 28 preferably spans between curved bars 4 and 12 in the position depicted. Such positioning advantageously allows cross brace 28 to dually function as a foot stand for enhanced rearward levering force, and as a structural bracing member. Suitably, cross braces 18 and 28 may be alternately positioned so that they span between the other bar pairs.

Referring further to FIG. 1, the instant inventive lawn tractor lift 1 may be easily and conveniently disassembled for compact garage storage. Disassembly is preferably begun by loosening set screws 22 and 26, releasing sleeve joints 20 and 24 for respective sliding motions over lever bars 2 and 10. Thereafter, cross brace 18, along with it attached sleeve joints 20 and 24, is slidably moved rearwardly along lever bars 2 and 10 until such joints disengage from the rearward end of the lift 1. Thereafter, spirally threaded nut and bolt combinations 40 and 46 are loosened, and are laterally withdrawn, such withdrawal allowing the lower ends of braces 38 and 44 to respectively splay leftwardly and rightwardly away from lever bars 2 and 10. Preferably, the upper ends of braces 38 and 44 remain fixedly attached to lift bars 8 and 16 by spirally threaded nut and bolt combinations 42 and 48. Thereafter, set screws 32 and 36 are loosened, allowing sleeve joints 30 and 34 and cross brace 28 to move slidably rearwardly along curved bars 4 and 12 until sleeve joints 30 and 34 meet the lower ends of braces 38 and 44. Thereafter, the lower ends of braces 38 and 44 are splayed as described above to provide clearance for rearward passages of sleeve joints 30 and 34. Thereafter, cross brace 28 and sleeve joints 30 and 34 are withdrawn rearwardly from the lift 1 in the manner of the removal of cross brace 18 described above. Thereafter, stub axles or journals 59 supported by the forward ends of lift bars 8 and 16 are leftwardly and rightwardly withdrawn from rotary bearings 58 and 60.

Upon completing the final step of releasing the pivot mounts, disassembly of the lawn tractor lift 1 is completed. In its disassembled configuration, the various components of the lift 1 may be compactly stored by hanging from hooks upon a garage wall. Reversal of disassembly steps described above conveniently reassembles the inventive lawn tractor lift 1 for use.

Figure 2:
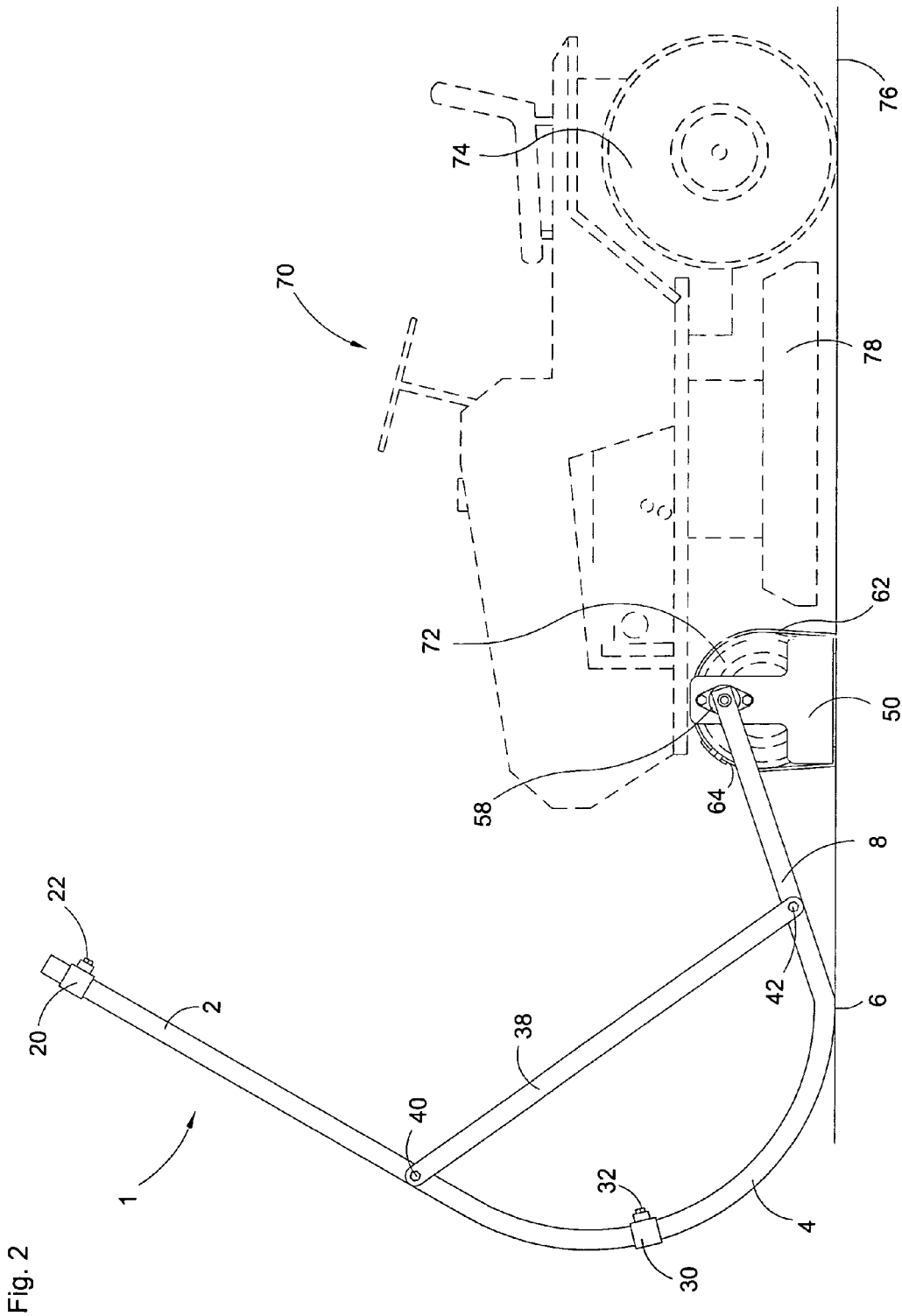
FIG. 2 is a side view of the instant inventive lawn tractor lift, such view showing its orientation at the commencement of a lawn tractor lifting operation.

In operation of the inventive lawn tractor lift, referring simultaneously to FIGS. 1 and 2 in use, the lift 1 is placed upon a garage floor surface 76, and the lift 1 is initially oriented so that the cross bars 54 and 56 of the tire cradle and fulcrum or pivot points 6 and 14 rest upon such surface. Thereafter, tire straps 62, 64, 66, and 68 are slidably moved along cross bars 54 and 56 so that the lateral positions of such straps align with the centers of the front tires 72 of lawn tractor 70. Thereafter, lawn tractor 70 is driven forwardly, causing its front tires 72 to roll over straps 62 and 66, then rolling over cross bar 56, and finally coming to rest with tire surfaces compressively contacting both cross bars 54 and 56. While the tires 72 are so positioned, they advantageously bulge or obturate into tire obturation space 55, allowing bars 54 and 56 to securely hold the tires 72. Thereafter, straps 62, 64, 66, and 68 are wrapped around tires 72, and are buckled and tightened. Upon strapping and buckling of tires 72, tires 72 are secured and are rendered incapable of falling from cross bars 54 and 56.

Thereafter, referring simultaneously to FIGS. 1 and 2, an operator performs a levering action, pulling rearwardly and downwardly upon cross bar 18. By placing a foot upon cross brace 28 simultaneously with pulling upon cross brace 18, the operator may enhance the torque which is applied to lever bars 2 and 10. Such levering action causes lever bars 2 and 10 and lift bars 8 and 14 to pivot about fulcrum points 6 and 14. At the commencement of such levering action, it can be seen in FIG. 2 that the ratio of the distance between sleeve 20 and fulcrum point 6, and the distance between bearing 58 and fulcrum point 6 is at a maximum, enhancing the lifting force such levering action applies to the front end of tractor 70.

As the front end of the tractor 70 raises in response to such levering action, the tractor's rear wheels 74 preferably roll forwardly toward the lawn tractor lift 1. Suitably, though less desirably, the rear wheels may remain locked. Where the rear wheels are locked during front end lifting, low friction skids (not depicted) or rollers (not depicted) are preferably supported by the curved bars 4 and 12 for low friction sliding or rolling contact with garage floor 76.

Figure 3:
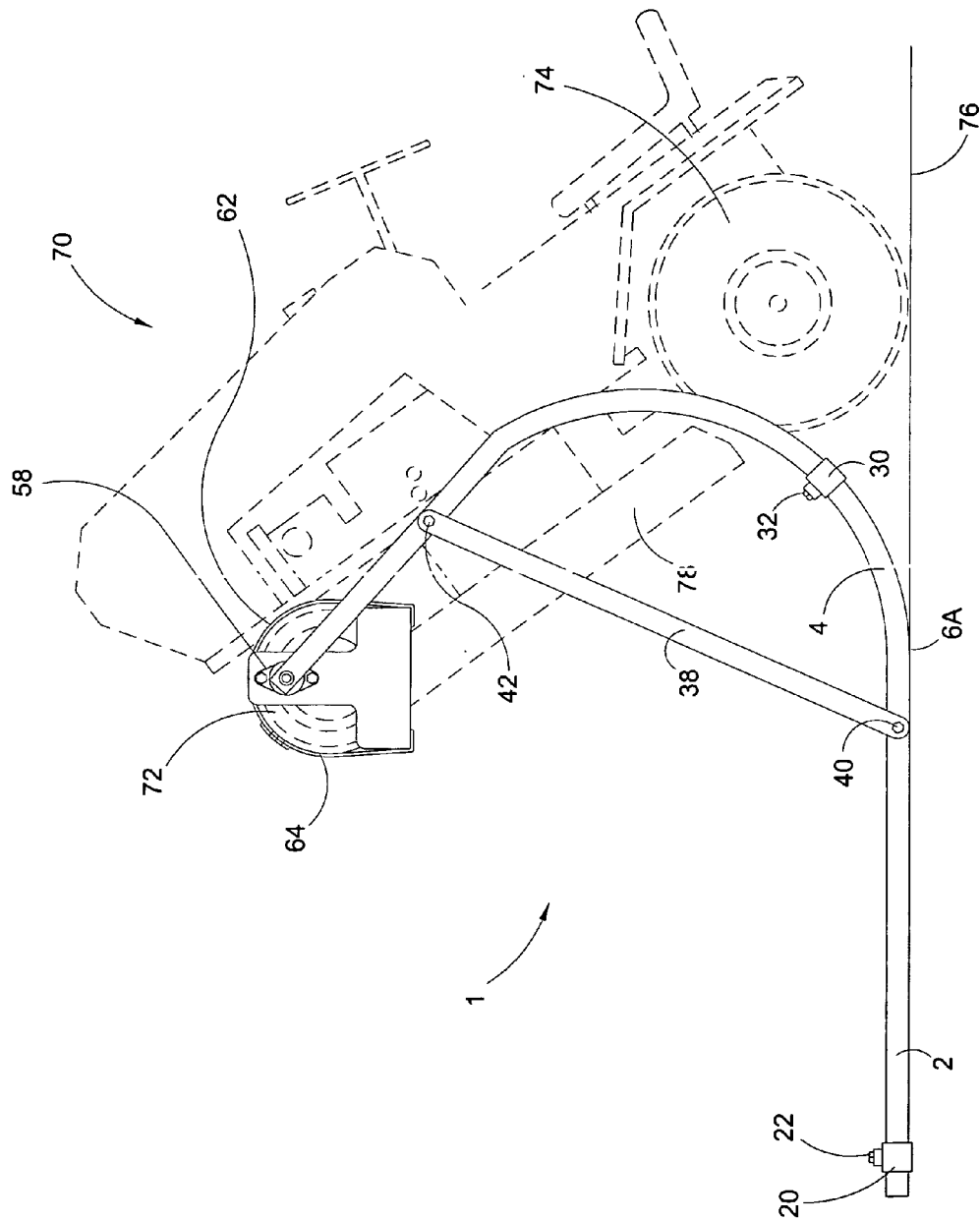
FIG. 3 is a side view of the instant inventive lawn tractor lift, such view showing its orientation at the end of the lawn tractor lifting operation.

Referring simultaneously to FIGS. 1–3, the above described tractor raising levering action continues until lever bars 2 and 10 come into contact with the garage floor surface 76. Viewing FIGS. 2 and 3 together, it can be seen that as lever bar 2 moves from the initial raised position depicted in FIG. 2 to the final floor contacting position depicted in FIG. 3, the fulcrum point upon curved bar 4 moves rearwardly from point 6 noted on FIG. 2 to point 6A noted on FIG. 3. As can be seen in FIG. 3, the ratio of the distance between sleeve 20 and point 6A and the distance between bearing 58 and point 6A is minimized, signifying an enhancement of the upward motion of the front end of the tractor 70 upon completion of the levering action.

According to the operation of the instant invention, as the fulcrum contact point moves rearwardly along the curved bars from point 6 to 6A, a mechanical lifting force advantage is progressively traded for a mechanical upward motion advantage. The progressive transition of mechanical advantages allows the inventive lawn tractor lift 1 to apply enhanced lifting power to the front end of tractor 70 while the tractor occupies its heaviest horizontal posture, and to subsequently raise the front end to the sharply angled mower deck maintenance position depicted in FIG. 3.

Upon raising the lawn tractor 70 to the mower deck maintenance position depicted in FIG. 3, the operator may clean the under surfaces of the mower deck 78 and may change rotary blades (not depicted) housed therein. A reversal of the lawn tractor raising steps described above counter levers the lift 1 and effectively lowers the lawn tractor 70 back to the position depicted in FIG. 2.

Referring simultaneously to FIGS. 1 and 3, it can be seen that while the lawn tractor lift 1 occupies its fully raised position, bearings 58 and 60 overlie points near the forward ends of lever bars 2 and 10 rather than overlying the rearward or lower ends of curved bars 4 and 12. As a result of such rearward orientation of bearings 58 and 60, FIG. 3 depicts lawn tractor 70 raised to a stable equilibrium position. While the lawn tractor lift 1 and lawn tractor 70 are positioned as configured in FIG. 3, the lawn tractor 70 will remain raised. So long as counter-levering forces applied to lever bars 2 and 10 remain absent and, so long as forward pushing forces applied to the lawn tractor 70 remain absent, the tractor will not fall from its raised position.

Further safeties against uncontrolled falling of the lawn tractor 70 from the position depicted in FIG. 3 may include provision and use of straps 62, 64, 66, and 68 as described above, locking of the rear wheels 74, application of sand bag weights (not depicted) to lever bars 2 and 10 or to cross bar 18, extending a tie (not depicted) between cross bar 28 and the axle of rear wheels 74, and providing articulating legs (not depicted) which are pivotingly extendable forwardly and downwardly from curved bars 4 and 12 to triangulate against the garage floor 76.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

We claim:

1. A lawn tractor lift comprising:
   (a) a lift arm having a forward end and a rearward end, the lift arm comprising left and right lever bars;
   (b) tractor wheel mounting means fixedly attached to the forward end of the lift arm, the tractor wheel mounting means comprising a tire cradle having left and right ends;
   (c) a lever arm having a forward end and a rearward end, the lever arm comprising left and right lever bars; and,
   (d) variable fulcrum means having a forward end and a rearward end, the rearward end of the variable fulcrum means being fixedly attached to or formed wholly with the forward end of the lever arm, the forward end of variable fulcrum means being fixedly attached to or formed wholly with the rearward end of the lift arm, the variable fulcrum means having a floor contacting surface, the variable fulcrum means, upon alternate levering and counter levering of the lever arm, alternately moving the floor contacting surface rearwardly toward the rearward end of the lever arm and forwardly toward the forward end of the lift arm; the tractor wheel mounting means further comprising means for pivoting the tire cradle with respect to the lift arm, the means for pivoting the tire cradle with respect to the lift arm being connected operatively to the left and right ends of the tire cradle, the means for pivoting the tire cradle with respect to the lift arm being further connected operatively to the forward end of the lift arm, the variable fulcrum means comprising left and right curved bars, the left curved bar spanning between the left lever bar and the left lift bar, and the right curved bar spanning between the right lever bar and the right lift bar.

2. The lawn tractor lift of claim 1 further comprising a first cross brace having left and right ends, and first cross brace mounting brackets fixedly attached to the left and right ends of the first cross brace, the first cross brace mounting brackets rigidly attaching the first cross brace to a first pair of bars selected from the group of paired bars consisting of the left and right lever bars, the left and right curved bars, and the left and right lift bars.

3. The lawn tractor lift of claim 2 further comprising a second cross brace having left and right ends, and second cross brace mounting brackets fixedly attached to the left and right ends of the second cross brace, the second cross brace mounting brackets rigidly attaching the second cross brace to a second pair of bars selected from the group of paired bars consisting of left and right lever bars, left and right curved bars, and left and right lift bars.

4. The lawn tractor lift of claim 3 wherein the first and second cross brace mounting brackets further respectively removably attach the first and second cross braces to the first and second pairs of bars.

5. The lawn tractor lift of claim 4 further comprising left and right "D" braces respectively mounted for rigidly supporting the left and right curved bars.

6. The lawn tractor lift of claim 5 wherein the tire cradle comprises front and rear cross bars defining therebetween a tire obturation space, the front and rear cross bars each having left and right ends.

7. The lawn tractor lift of claim 6 further comprising a plurality of tire straps fixedly and laterally slidably attached to the front and rear cross bars.

8. The lawn tractor lift of claim 7 wherein the pivoting means overlie the left and right ends of the front and rear cross bars.

* * * * *